United States Patent [19]
Rizk et al.

[11] Patent Number: 5,127,712
[45] Date of Patent: Jul. 7, 1992

[54] ABS PUMP OUTPUT PULSATION DAMPENER

[75] Inventors: Gamil M. Rizk, South Bend; Jeffrey D. Patterson, Mishawaka, both of Ind.

[73] Assignee: Allied-Signal Inc., Morristown, N.J.

[21] Appl. No.: 624,939

[22] Filed: Dec. 10, 1990

[51] Int. Cl.⁵ .................... B60T 8/32; F16K 31/12
[52] U.S. Cl. ........................ 303/87; 303/10; 303/116 PC; 137/110
[58] Field of Search ........... 303/87, 84.1, 10, 116 PC; 138/30; 137/110

[56] References Cited

U.S. PATENT DOCUMENTS

| | | | |
|---|---|---|---|
| 3,477,232 | 11/1969 | Porter | 303/87 |
| 4,116,495 | 9/1978 | Belart | 303/115 |
| 4,316,642 | 2/1982 | Belart | 303/116 |
| 4,422,695 | 12/1983 | Farr | 303/115 |
| 4,571,009 | 2/1986 | Jones | 303/87 |
| 4,622,992 | 11/1986 | Sutherland | 137/110 |
| 4,624,508 | 11/1986 | Adachi et al. | 303/116 |
| 4,750,329 | 6/1988 | Horiuchi et al. | 60/547.1 |
| 4,807,945 | 2/1989 | Budecker et al. | 303/114 |
| 4,818,039 | 4/1989 | Bertlinger et al. | 303/113 |
| 4,846,535 | 7/1989 | Kuwana et al. | 303/117 |
| 4,877,296 | 10/1989 | Leiber et al. | 303/115 |
| 4,893,882 | 1/1990 | Leiber et al. | 303/115 |
| 4,898,432 | 2/1990 | Brown, Jr. | 303/114 |

Primary Examiner—Matthew C. Graham
Attorney, Agent, or Firm—Larry J. Palguta; Ken C. Decker

[57] ABSTRACT

The ABS pump output pulsation dampening device (59) comprises a body (10) having disposed therein a pressure source (12) communicating with an inlet line (14) that transmits pressure to an outlet line (16) via an accumulator or storage chamber (20). The body (10) receives at an open end (13) a spring (38) operated accumulator (30) having an accumulator piston (36) received within said accumulator chamber (20). One end (50) of the accumulator piston (36) includes an interior opening (32) which receives slideably and with clearance a dampening piston (60) and a resilient member (62) which biases the dampening piston (60) into engagement with a seat (15) at the end of the inlet line (14). The dampening piston (60) includes an orifice (64) at an one end (63) adjacent the seat (15) and which communicates with a passage (65) extending through the dampening piston (60). Low fluid pressure pulsations transmitted by the pressure source (12) are dampened by the dampening piston (62) as the low pressure fluid is transmitted through the orifice (64), passage (65), interior opening (52), and clearance to the outlet line (16). Beyond a predetermined pressure level, the dampening piston (60) disengages the seat (15) to permit fluid flow therepast.

10 Claims, 2 Drawing Sheets

ABS PUMP OUTPUT PULSATION DAMPENER

The present invention relates generally to a device for dampening pressure pulsations created by a pump, and in particular to an adaptive braking system pressure pulsation dampening device for the pump output.

Many adaptive braking systems include a pump which, upon activation, transmits fluid pressure to the vehicle brakes via various components of the adaptive braking system. When the pump is activated, the initial low fluid pressure transmitted by the pump tends to cause pressure pulsations which, when transmitted to the front brakes and the vehicle is on a low coefficient of friction surface such as snow or ice, may cause the front brakes to experience a locking and unlocking commonly referred to as "sprag". Sprag is highly undesirable because this locking and unlocking, at low pump pressures, results in an undesirable mode of operating the vehicle front brakes and considerable noise in the adaptive braking system. It is highly desirable to eliminate sprag from an adaptive braking system, so that the front brakes will not experience the locking and unlocking, and thereby eliminate the noise created by this undesirable operation of the brakes. It is also highly desirable to provide a sprag elimination device which may be easily incorporated within another component of the adaptive braking system.

The present invention provides solutions to the above problems by providing a pressure source output pulsation dampening device, comprising a body and pressure source means communicating fluid pressure with an inlet line of the body, the inlet line communicating with an outlet line via a seat and pressure storage chamber means, the pressure storage chamber means located within said body and including movable pressure storage piston means which defines a portion of said storage chamber means, the storage piston means including at one piston end an interior opening receiving therein dampening piston means and resilient means, the resilient means biasing one end of the dampening piston means into engagement with said seat, the dampening piston means comprising at said one end an orifice which communicates with passage means that permits fluid flow with said interior opening, and the dampening piston means received slideably with clearance in said interior opening, so that fluid pressure transmitted by said pressure source means is transmitted, up to a predetermined pressure level, through said orifice, passage means, interior opening and clearance to said storage chamber means and outlet line such that pressure pulsations transmitted from said pressure source means are dampened.

The present invention is described in detail by the following description taken in conjunction with the drawings which illustrate an embodiment of the present invention in which.

Figure 1:
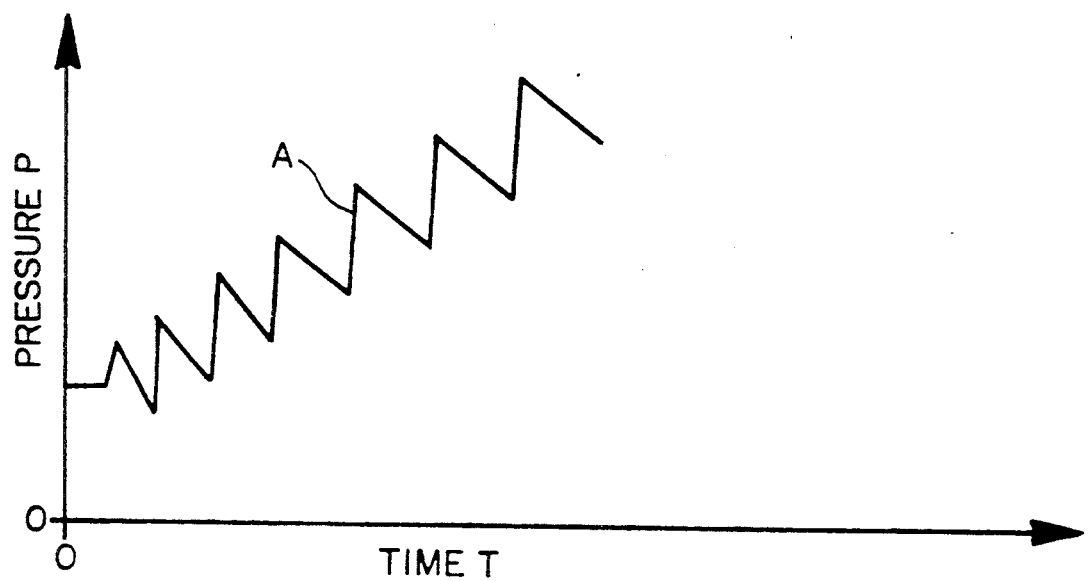
FIG. 1 is a graph of pressure versus time for a pump output pressure causing sprag in an adaptive braking system and not utilizing the dampening device of the present invention.

FIG. 1 is a graphic illustration of fluid pulsations created at generally low pressure levels by an adaptive braking system pump after it has been activated. Once the pump has been activated, the pressure increases over time, but the pump creates fluid pressure pulsations which, as apparent from curve A, will cause the vehicle's front brakes to lock and unlock the associated wheels; this undesirable function is known as sprag and includes accompanying loud noises generated thereby. It is an object of the present invention to dampen the large fluid pressure pulsations created by the adaptive braking system pump, so that not only is sprag eliminated but the accompanying loud noises are also eliminated.

Figure 2:
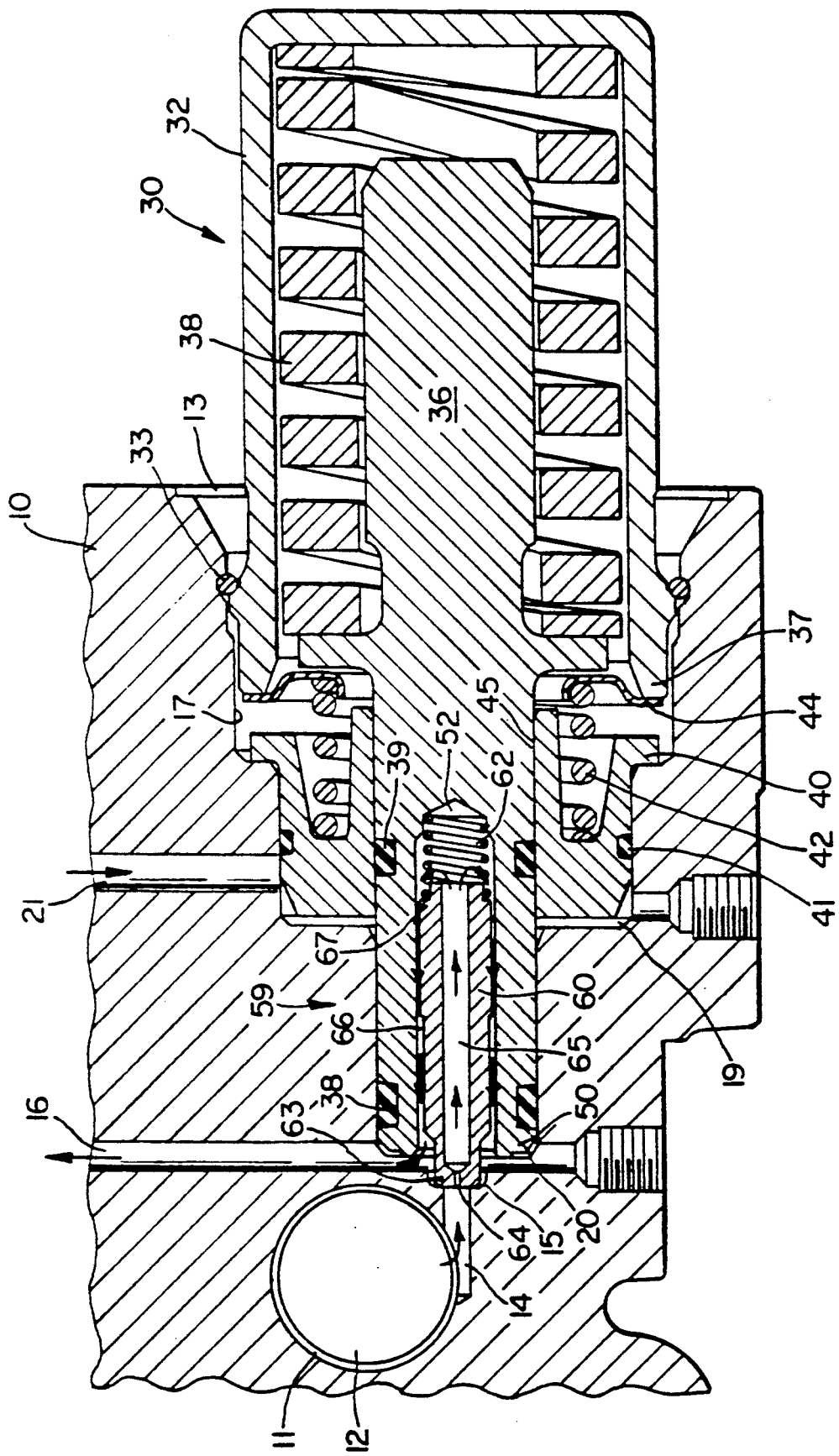
FIG. 2 is a section view of the dampening device and associated components of the present ivention.

Referring to FIG. 2, a body 10 within an adaptive braking system includes cavity 11 which receives moveable pump component or pressure source means 12 that transmits fluid pressure to inlet line 14 which communicates with outlet line 16 via seat 15. Outlet line 16 communicates with the vehicle brakes (not shown). Inlet line 14 communicates with outlet line 16 via pressure storage chamber means or accumulator chamber 20. Body 10 includes open end 13 which receives therein pressure storage means or accumulator 30 which comprises accumulator housing 32 held by snap ring 33 within stepped body bore 17, and an accumulator piston or pressure storage piston means 36 biased by first spring means 38 toward storage or accumulator chamber means 20. Stepped bore 17 includes sump chamber 19 which communicates with sump passage 21. Disposed about storage piston means 36 is sump piston 40 having seal 41 engaging stepped bore 17, second spring means 42, and spring plate 44 which seats on end 37 of accumulator housing 32. The accumulator piston or pressure storage piston means 36 includes a pair of spaced-apart seals 38 and 39, seal 39 engaging the surface of sump interior bore 45. Sump piston 40 may move slidably along accumulator piston 36 as the volume of sump chamber 19 varies.

Accumulator piston 36 includes at piston end 50 an interior opening 52 which receives therein a dampening device 59 comprising dampening piston means 60 and resilient means 62. Resilient means 62 biases dampening piston means 60 toward inlet line 14 and seat 15. Dampening piston means 62 includes at one end 63 an orifice 64 which communicates with passage means 65 that terminates at the other end 67, and an exterior recessed area 66. The dampening piston means is receceived, along its entire length, with clearance in interior opening 52. Resilient means 62 keeps dampening piston means 60 engaged at end 63 with seat 15 during periods when the pump transmits low fluid pressures toward outlet line 16. Upon exceeding a predetermined pressure level, piston means 60 is displaced toward the right so that the pump may communicate directly with outlet line 16 rather than communicating via orifice 64, passage 65, interior opening 52, and the clearance with opening 52. Of course, as higher pressures are transmitted by the pump to outlet line 16, accumulator piston 36 may also translate to the right.

The dampening device of the present invention operates as follows in conjunction with its associated components. The device 59 and accumulator piston 36 are shown in an at rest, inactive pressurization level. When pressure source means 12 is activated, low fluid pressure is transmitted initially via inlet line 14 to seat 15 where, as a result of the biasing force of resilient means 62, the fluid must pass through orifice 64, passage 65, into interior opening 52, and then through the clearance around the outer surface of piston means 60 in the direction indicated by the arrows, toward storage chamber means 20 and outlet line 16. Because piston means 60 is received with clearance, along its entire length, within interior opening 52, fluid pressure can flow from passage 65 into interior opening 52, between the outer surface of piston means 60 and the surface of opening 52, to storage chamber means 20 and outlet line 16. Piston means 60 dampens pressure pulsations that may occur up to approximately 500 psi. Above this approximate predetermined pressure level, presssure pulsations from the pump do not occur and are not a problem. Additionally, as the pump transmits further higher pressures, accumulator piston 36 can, at or above approximately 2000 psi, translate to the right so that fluid pressure is stored within storage chamber means 20. This ensures that when pressure source means 12 ceases operation, piston means 60 will not engage seat 15 as long as sufficiently high fluid pressure is present within storage chamber means 20.

Figure 3:
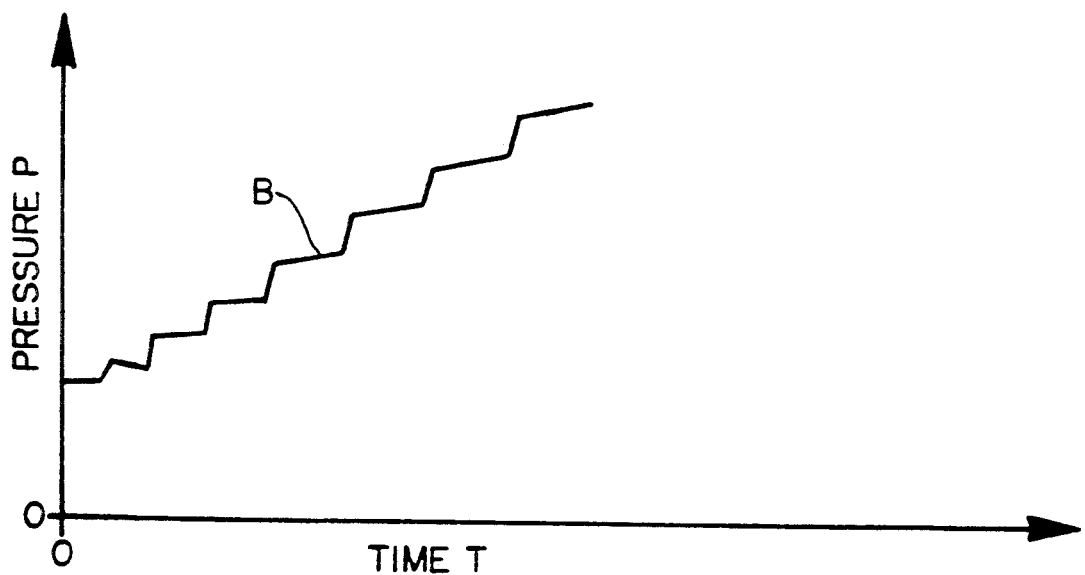
FIG. 3 is an illustration of pump output pressure versus time for an adaptive braking system utilizing the dampening device of the present invention.

The pump output pulsation dampening device of the present invention has proved successful in dampening low pressure pump pulsations created by the pump of an adaptive braking system. Referring to FIG. 3, the pump output Pressure transmitted to the front brakes of a vehicle is illustrated schematically and it can be seen readily that the pressure pulsations of curve B have been significantly dampened so as to eliminate sprag and the accompanying highly undesirable noise during braking on a low coefficient of friction surface. Not only is sprag and its accompanying noise eliminated, but dampening device 59 comprises an easily and inexpensively constructed device which may be located within the piston of the system's accumulator, thereby minimizing structural and specification changes to the system.

We claim:

1. A pressure source output pulsation dampening device, comprising a body and pressure source means communicating fluid pressure with an inlet line of the body, the inlet line communicating with an outlet line via a seat and pressure storage chamber means, the pressure storage chamber means located within said body and including movable pressure storage piston means which defines a portion of said storage chamber means, the storage piston means including at one piston means end an interior opening receiving therein dampening piston means and resilient means, the resilient means biasing one end of the dampening piston means into engagement with said seat, the dampening piston means comprising at said one end an orifice which communicates with passage means that permits fluid flow with said interior opening, and the dampening piston means received slideably with clearance in said interior opening, so that fluid pressure transmitted by said pressure source means is transmitted, up to a predetermined pressure level, through said orifice, passage means, interior opening and clearance to said storage chamber means and outlet line such that pressure pulsations transmitted from said pressure source means are dampened.

2. The device in accordance with claim 1, wherein said pressure source means comprises a pump disposed within a cavity in said body.

3. The device in accordance with claim 2, wherein said pressure storage chamber means and storage piston means comprise an accumulator which includes spring means biasing said storage piston means.

4. The device in accordance with claim 3, further comprising a sump chamber, sump piston means, and second spring means biasing said sump piston means, all disposed coaxially about said storage piston means.

5. The device in accordance with claim 4, wherein said accumulator comprises a pair of spaced apart seals disposed about the storage piston means, one of said seals slideably engaging a surface of an interior bore of said sump piston means.

6. The device in accordance with claim 5, wherein said accumulator comprises an accumulator housing received within an end opening of said body, and the second spring means engaging a spring plate seated at an end of said accumulator housing.

7. The device in accordance with claim 1, wherein said dampening piston means comprises a longitudinally slideable piston received with said clearance between a piston outer surface and said interior opening, the piston abutting the seat which is located at an end of said inlet line.

8. A pump output pulsation dampening device, comprising a body and pump means communicating fluid pressure with an inlet line of the body, the inlet line communicating with an outlet line via a seat and an accumulator chamber of an accumulator, the accumulator chamber located within said body and including an accumulator piston which defines a portion of said storage chamber, the piston including at one piston end an interior opening receiving therein a dampening piston and resilient means, the resilient means biasing one end of the dampening piston into engagement with said seat, the dampening piston comprising at said one end an orifice which communicates with a passage that permits fluid flow with said interior opening, and the dampening piston received slideably with clearance in said interior opening, so that fluid pressure transmitted by said pump means is transmitted, up to a predetermined pressure level, through said orifice, passage, interior opening and clearance to said chamber and outlet line such that pressure pulsations transmitted by said pump means are dampened.

9. The device in accordance with claim 8, further comprising a sump chamber, a sump piston, and spring means biasing said sump piston, all disposed coaxially about said accumulator piston.

10. The device in accordance with claim 9, wherein said accumulator comprises a pair of spaced apart seals disposed about the accumulator piston, one of said seals slideably engaging a surface of an interior bore of said sump piston.

* * * * *